L. A. CLAYTON.
NUT LOCK BOLT.
APPLICATION FILED MAR. 27, 1918.
1,315,284.
Patented Sept. 9, 1919.
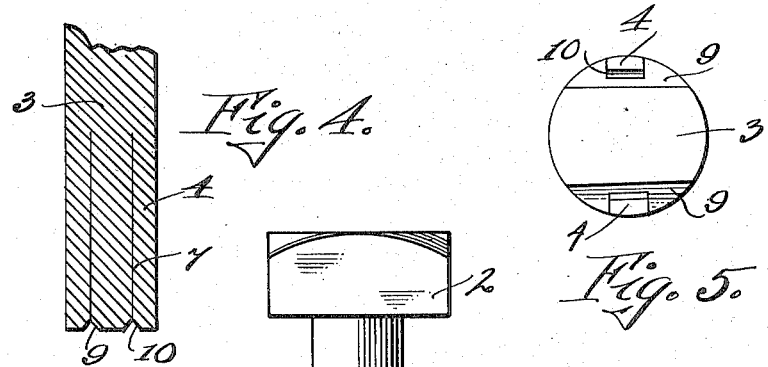
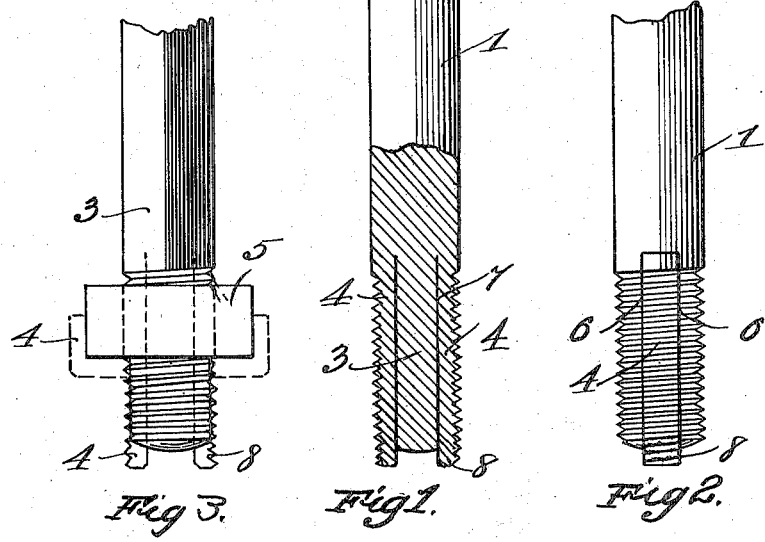
INVENTOR
Leffie A. Clayton
WITNESSES

UNITED STATES PATENT OFFICE.

LEFFIE A. CLAYTON, OF BEAVER COUNTY, OKLAHOMA.

NUT-LOCK BOLT.

1,315,284.     Specification of Letters Patent.     Patented Sept. 9, 1919.

Application filed March 27, 1918. Serial No. 225,051.

*To all whom it may concern:*

Be it known that I, LEFFIE A. CLAYTON, a citizen of the United States, residing in the county of Beaver and State of Oklahoma, have invented certain new and useful Improvements in Nut-Lock Bolts, of which the following is a specification.

My invention relates to new and useful improvements in nut lock bolts and more particularly to that type of bolts which embodies one or more keys or tongues which are adapted to be bent back and over the nut to prevent further rotation of the nut.

An important object of my invention is to provide a device including a pair of tongues struck out from the threaded portion of the bolt and are of such length as to facilitate their being bent back so that the nut is engaged by the threaded portion of the pair of tongues.

Another object of my invention is to provide a device of the above mentioned character the bolt of said device having recesses in its threaded ends, adjacent the free ends of the tongues, to provide a space whereby a chisel or other suitable tool may be readily driven against the tongues to force them away from the threaded portion of the bolt.

Another object of my invention is to provide a device which is strong, durable, inexpensive to manufacture and is efficient in practice.

Other objects and advantages of my invention will be apparent during the course of the following description.

In the accompanying drawings, forming a part of the description:—

Figure 1 is a sectional view through the threaded ends of the bolt,

Fig. 2 is a side elevation of the same,

Fig. 3 is a side elevation of the bolt with the nut applied thereto, and the tongues being shown in dotted lines and in their locked position, Fig. 4 is a modified form of my invention, and Fig. 5 is an end view of the same.

In the drawings, wherein for the purpose of illustration, is shown a preferred embodiment of my invention, the numeral 1 designates the usual body portion of a bolt having the usual head 2 and threaded end 3.

The locking element or tongues 4 are formed from and are parts of the threaded end of the bolt. In the present instance, a pair of tongues 4 are provided to lock the nut 5 and are arranged diametrically of each other upon the threaded end of each bolt. However, I do not wish to restrict myself to the number of keys used since it is possible to effectively use one tongue when the invention is applied to small nuts and bolts. The tongues 4 are arranged longitudinally of the bolt and are adapted to extend the whole length of the threaded portion 3 of the bolt. Each tongue is formed by making a pair of spaced longitudinal cuts 6 a substantial distance into the threaded portion 3. Then a cut 7 is made so that it joins the two longitudinal cuts 6 to form the key 4. From the foregoing it will be seen that the outermost ends of the tongues 4 may be bent away from the body portion of the bolt 1, but are held thereto since they are formed integral with the bolt. As will be noted these tongues are struck out from the outer periphery of the bolt and are threaded upon their outer surfaces to coact with the threaded portion of the bolt.

In Figs. 1, 2 and 3 it will be seen that the tongues 4 extend a substantial distance past the end of the bolt as at 8, so that a chisel or other suitable tool may readily engage this extended end 8 so that the tongues may be readily bent back against the nut 5 as clearly shown in Fig. 3.

The means provided in Figs. 4 and 5 for allowing the operator to spread the tongue 4 are a pair of recesses 9 formed in the end of the bolt 3. It will be noted that these recesses extend parallel to the cut 7 so as to expose the inner beveled face 10 of the outermost ends of the tongues 4. It will be seen that any suitable tool can be abutted against this inner beveled face to facilitate the operator spreading the tongues 4 away from the body portion of the bolt.

In operation the nut 5 is rotated upon the threaded end of the bolt 1 until it abuts with its work through which the bolt 1 is passed. The tongues 4 are bent away from the bolt until one portion thereof engages with the outermost face of the nut. The free end of the tongues 4 are then bent or pounded into close engagement with the opposite square faces of the nut 5. This arrangement is more clearly shown in Fig. 3, and it will be readily recognized that further rotation of the nut is impossible.

It is to be understood that the form of my invention herewith shown and described is to be taken as a preferred embodiment of the same and various changes in the shape, size and arrangement of parts may be resorted to without departing from the spirit of the invention within the scope of the subjoined claims.

Having described my invention I claim:

1. The combination of a nut and bolt, said bolt having a pair of longitudinal tongues struck therefrom and extending the full length of the threaded portion of the bolt, the end of said bolt having recesses adjacent said tongues, and said tongues having a beveled face coöperating with said recess.

2. In combination with a nut and bolt, said bolt having a threaded end, said threaded end being provided with two longitudinally extending spaced cuts in the threaded end thereof and extending the full length of the threaded part of the bolt, said threaded end being further provided with a cut joining the first two named cuts to form a yieldable tongue, said tongue being bent back and into close engagement with said nut when it is desired to lock the nut against further rotation.

In testimony whereof I affix my signature in presence of two witnesses.

LEFFIE A. CLAYTON.

Witnesses:
ANNA D. EARL,
MARK C. SHARPE.